(12) United States Patent
Roman et al.

(10) Patent No.: US 11,926,384 B2
(45) Date of Patent: Mar. 12, 2024

(54) BICYCLE WITH REMOVABLE BATTERY

(71) Applicant: FANTIC MOTOR S.P.A., Casier (IT)

(72) Inventors: Mariano Roman, Noale (IT); Enrico Fidelfatti, Camisano Vicentino (IT)

(73) Assignee: FANTIC MOTOR S.P.A., Casier (IT)

( * ) Notice: Subject to any disclaimer, the term of this patent is extended or adjusted under 35 U.S.C. 154(b) by 229 days.

(21) Appl. No.: 17/381,364

(22) Filed: Jul. 21, 2021

(65) Prior Publication Data
US 2022/0033025 A1 Feb. 3, 2022

(30) Foreign Application Priority Data
Jul. 30, 2020 (IT) .......................... 102020000018547

(51) Int. Cl.
*B62J 43/23* (2020.01)
*B62J 43/13* (2020.01)
*B62J 43/28* (2020.01)
*B62M 6/90* (2010.01)

(52) U.S. Cl.
CPC ............... *B62J 43/23* (2020.02); *B62J 43/13* (2020.02); *B62J 43/28* (2020.02)

(58) Field of Classification Search
CPC ... B62J 43/00; B62J 43/10; B62J 43/13; B62J 43/16; B62J 43/29; B62J 43/23; B62J 43/28; B62J 1/19; B62J 11/19; B62M 6/90; B60L 50/66
USPC ..................................... 180/68.5, 207.3, 220
See application file for complete search history.

(56) References Cited

U.S. PATENT DOCUMENTS

| | | | | |
|---|---|---|---|---|
| 6,016,882 A * | 1/2000 | Ishikawa | ................ | B62K 19/46 180/68.5 |
| 9,260,157 B2 * | 2/2016 | Chu | ................. | B62M 6/45 |
| 2005/0029033 A1 * | 2/2005 | Rip | ..................... | B62J 1/08 180/220 |
| 2006/0088758 A1 * | 4/2006 | Wu | ................... | B62K 19/30 429/97 |

(Continued)

FOREIGN PATENT DOCUMENTS

CN 2874781 Y 2/2007
CN 207173879 U 4/2018
(Continued)

OTHER PUBLICATIONS

Italian Search Report and Written Opinion dated Mar. 12, 2021 issued in IT 202000018547, with partial translation.
(Continued)

*Primary Examiner* — Anne Marie M Boehler
(74) *Attorney, Agent, or Firm* — Scully, Scott, Murphy & Presser, P.C.

(57) ABSTRACT

A bicycle with removable battery for supplying power to electric components, comprising a frame composed of an upper tube connected with a front oblique tube and with a rear vertical tube, which in turn are connected in a lower region so as to form a seat for a bottom bracket and with which a pair of horizontal rear chainstays and a pair of oblique rear chainstays are coupled. The front oblique tube has an axial seat for a removable battery and for accommodating connection and/or electric power supply cables. The axial seat has an axis that passes above the bottom bracket and a lower end that is open and located at the interspace between the pair of horizontal rear chainstays.

9 Claims, 10 Drawing Sheets

(56) References Cited

U.S. PATENT DOCUMENTS

| | | | |
|---|---|---|---|
| 2013/0241170 A1 | 9/2013 | Talavasek et al. | |
| 2018/0269439 A1* | 9/2018 | Yoneda | B62M 6/90 |
| 2020/0247502 A1* | 8/2020 | Mitsuyasu | H01M 50/202 |
| 2020/0354017 A1* | 11/2020 | De La Serna Gonzalez | B62M 6/90 |
| 2020/0385087 A1* | 12/2020 | Carlier | B62J 9/27 |
| 2021/0147032 A1* | 5/2021 | Farrell | B62K 3/04 |
| 2022/0185407 A1* | 6/2022 | Chang | B62J 45/20 |
| 2022/0289336 A1* | 9/2022 | Philipzik | B62J 43/13 |

FOREIGN PATENT DOCUMENTS

| | | |
|---|---|---|
| CN | 108146568 A | 6/2018 |
| CN | 108482571 A | 9/2018 |
| CN | 208198714 U | 12/2018 |
| CN | 111148686 A | 5/2020 |
| DE | 202019100323 U1 | 4/2020 |
| EP | 2 998 212 A1 | 3/2016 |
| EP | 3434574 A1 | 1/2019 |
| EP | 3 590 813 A1 | 1/2020 |
| FR | 2 957 583 A3 | 9/2011 |
| JP | 2013-122816 A | 6/2013 |
| JP | 2016-032999 A | 3/2016 |
| KR | 10-2013-0049474 A | 5/2013 |
| WO | 99/26837 A1 | 6/1999 |
| WO | 2018/199763 A2 | 11/2018 |
| WO | 2019/038463 A2 | 2/2019 |
| WO | 2019/209104 A2 | 10/2019 |

OTHER PUBLICATIONS

Chinese Office Action dated Jan. 19, 2023 received in Chinese Application No. 202110872133.8, together with an English-language translation.

\* cited by examiner

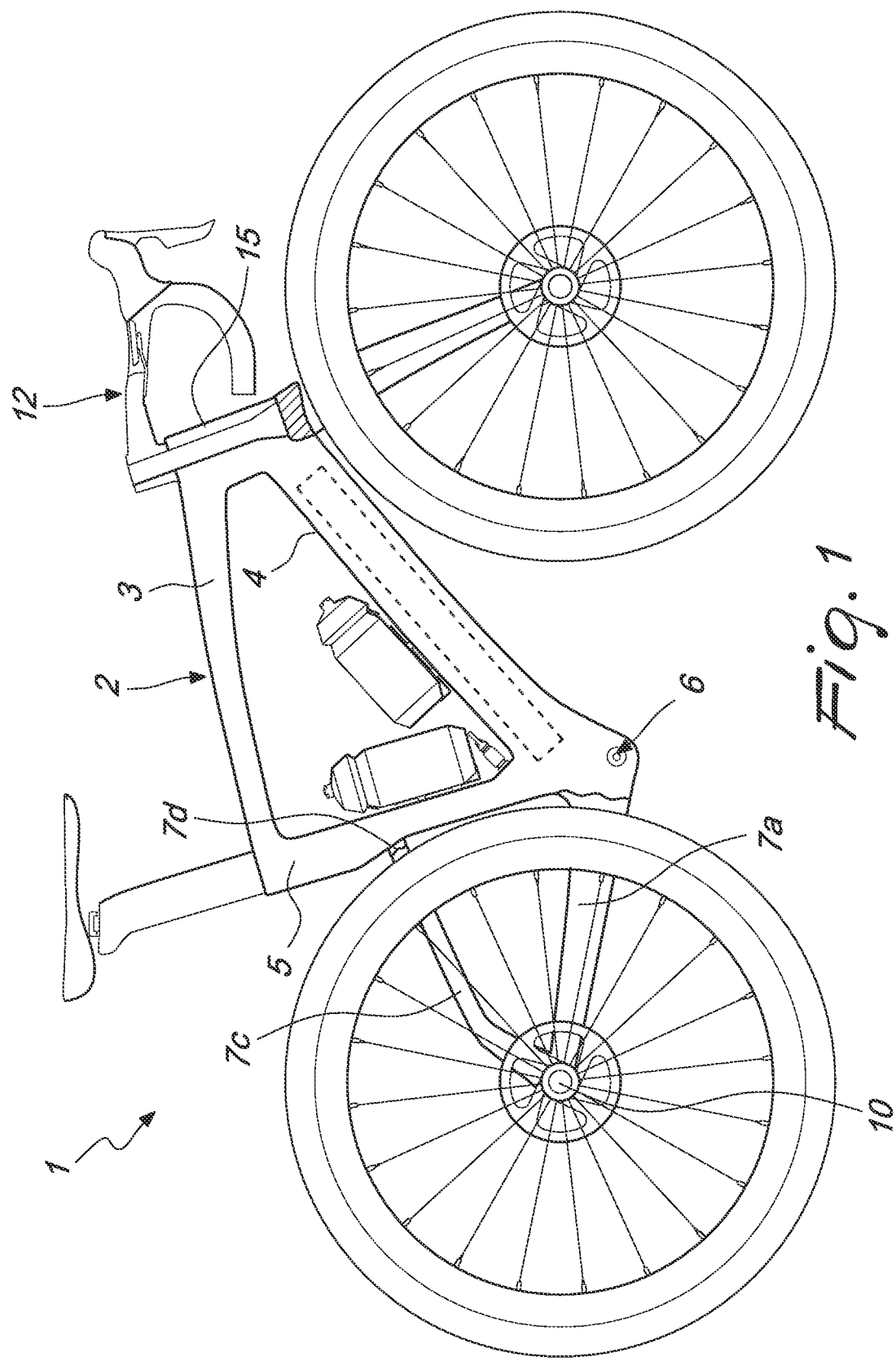

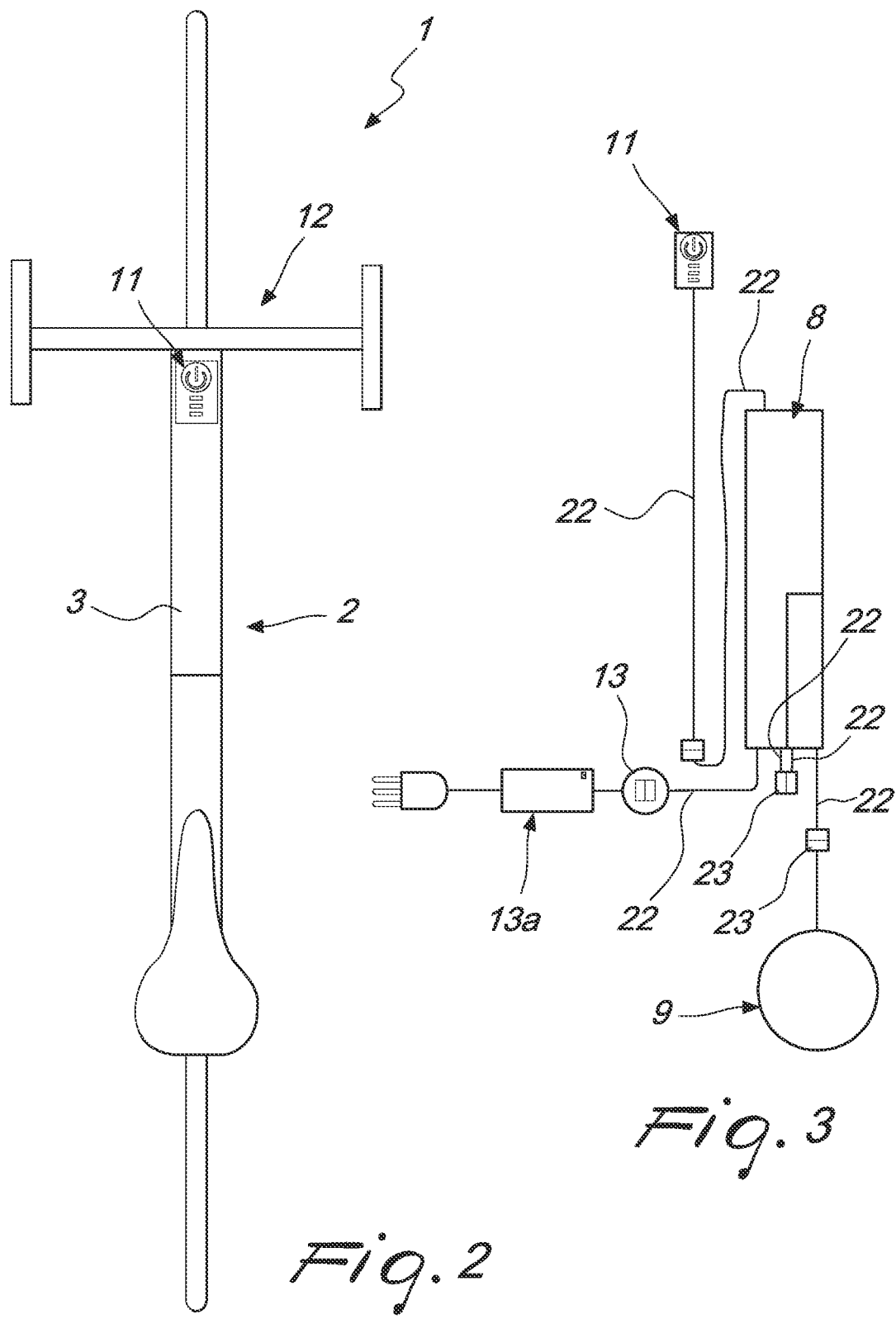

BICYCLE WITH REMOVABLE BATTERY

The present invention relates to a bicycle with removable battery for supplying power to electric components.

Bikes or bicycles of the known type are usually constituted by a frame composed of various tubular elements so as to obtain a structure composed substantially of an upper tube connected with a front oblique tube and with a rear vertical tube, which in turn are connected in a lower region in order to define a seat for a bottom bracket and to which two oblique rear chainstays are coupled, a hub for the rear wheel being associable with the terminal ends of said chainstays.

In the case of an electric bicycle, an adapted and known electric motor is associated with the hub, and it is also necessary to associate with the bicycle a battery, which initially was fixed but with the evolution of technology it is known to be of the removable type for its maintenance and replacement.

Various battery fixing systems are known; among them JP2016032999 is known which describes a battery arranged at a seat provided starting from the lower end of the rear vertical tube (also known as seat post) in the connecting region of the horizontal rear chainstays and to the rear of the bottom bracket; the seat is therefore substantially vertical and the battery has to be inserted upward from below.

Although this solution allows to lower the center of gravity to improve ride stability and the battery insertion position is inconspicuous, there is at the same time a serious drawback, since the shape and arrangement of the seat causes the frame to lose rigidity once the battery has been extracted.

JP2013122816 is also known which describes a solution in which the battery is incorporated axially with respect to the saddle post tube; this solution, too, has drawbacks, since the weight of the battery and its location close to the saddle raise the center of gravity of the bicycle, thus increasing the instability of the vehicle during the ride.

Furthermore, the saddle post tube must be hollowed out in order to accommodate the battery and therefore the strength of the saddle post tube is reduced.

It is also known to arrange the battery below the lower surface of the front oblique tube, so that the battery is oriented in the direction of the front wheel; in this case the tube has a C-shaped cross-section adapted to accommodate the battery between its wings.

This solution, too, has a drawback due to the C-shape of the cross-section of the tube, which causes a loss of structural rigidity of the frame.

It is also known to arrange the battery inside the front oblique tube in axial alignment with the bottom bracket: in this case replacement of the battery requires the disassembly of the bottom bracket and it is therefore time-consuming and complex.

It is also known to arrange the battery inside the front oblique tube so that it is axially offset with respect to the bottom bracket in the direction of the front wheel.

Since a control button is connected to the battery by means of a connector, in both of the previous cases it is necessary to disconnect the connector before extracting the battery, and in order to do so it is necessary to disassemble the headset.

The extraction of this battery, therefore, is not simple and requires experience and time.

The aim of the present invention is thus to solve the highlighted technical problems, removing the drawbacks of the cited background art and thus devising a bicycle that allows the quick and easy insertion and extraction of a battery that supplies electric power to the various electrical components.

Within this aim, an object of the invention is to provide a bicycle in which the use of a battery allows to improve ride stability.

Another object of the invention is to obtain a bicycle in which the battery is protected from any accidental impacts and at the same time is easily accessible for replacement.

A further object is to provide a bicycle in which the use of a battery allows in any case to facilitate the insertion of all the connectors so that they can be easily reached and disconnected.

Not least object is to obtain a bicycle that requires components that are usually available commercially and has low production and maintenance costs.

This aim and these and other objects which will become better apparent hereinafter are achieved by a bicycle 1 with removable battery 8 for supplying power to electric components 9, 11, comprising a frame 2 composed of an upper tube 3 connected with a front oblique tube 4 and with a rear vertical tube 5, which in turn are connected in a lower region so as to form a seat 6 for a bottom bracket and with which a pair of horizontal rear chainstays 7a, 7b and a pair of oblique rear chainstays 7c, 7d are coupled, characterized in that said front oblique tube 4 has an axial seat 14 for a removable battery 8 and for accommodating connection and/or electric power supply cables 22, said axial seat 14 having an axis that passes above said bottom bracket and a lower end 14b that is open and located at the interspace between said pair of horizontal rear chainstays 7a, 7b.

Advantageously, the axial seat 14 accommodates a supporting slider 16 for an extractable plate 20 with which said battery 8 is associated.

Further characteristics and advantages of the invention will become better apparent from the detailed description of a particular but not exclusive embodiment, illustrated by way of non-limiting example in the accompanying drawings, wherein:

FIG. 1 is a first side view of a bicycle according to the present invention;

FIG. 2 is a schematic top view of the bicycle;

FIG. 3 is a schematic view of the battery connections;

Figure 4:
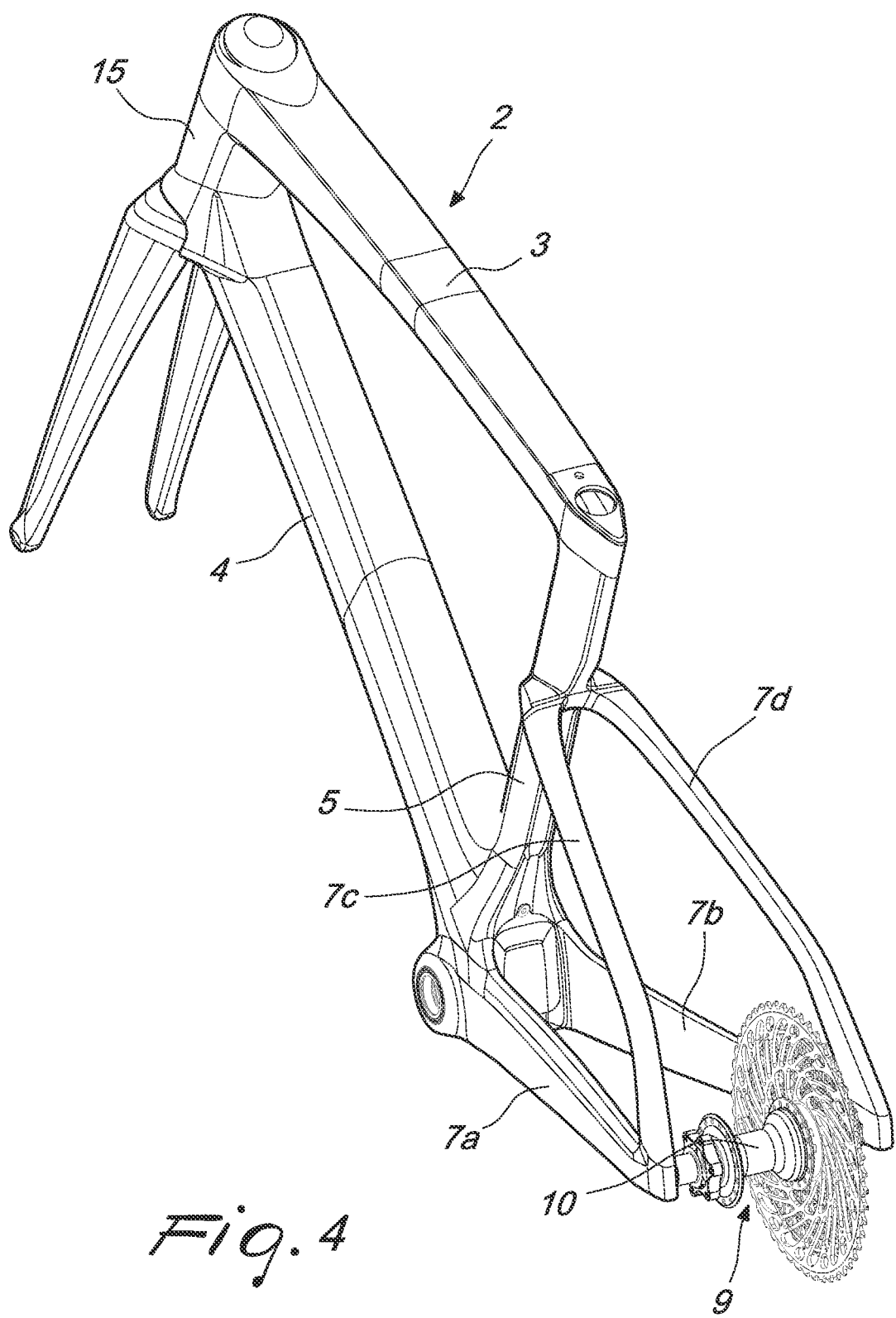
FIG. 4 is a rear perspective view of the frame of the bicycle with the battery inserted.
Figure 5:
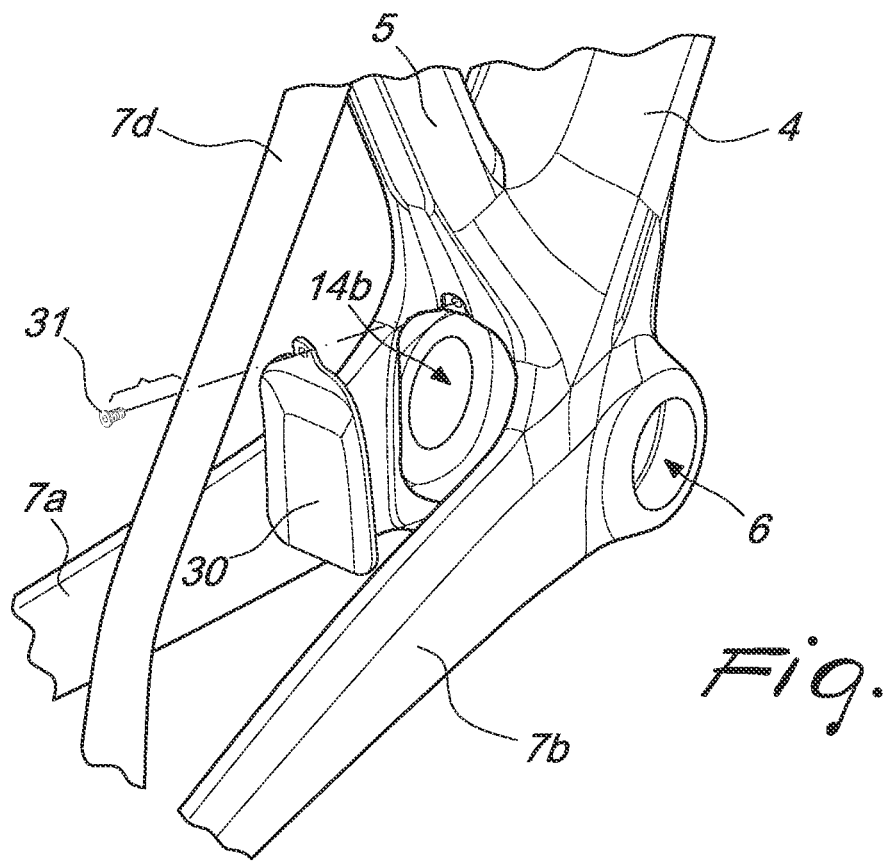
FIG. 5 is a view of a detail of the door for closing the access opening for the battery.
Figure 6:
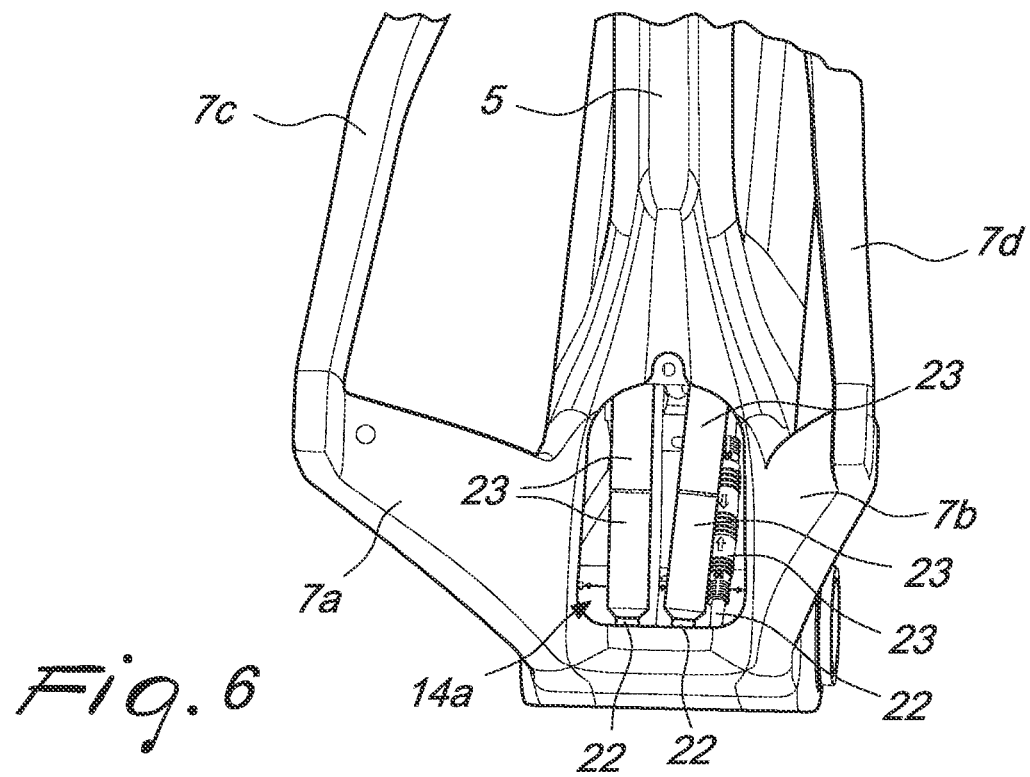
FIG. 6 is a rear view of the access to the battery.
Figure 7:
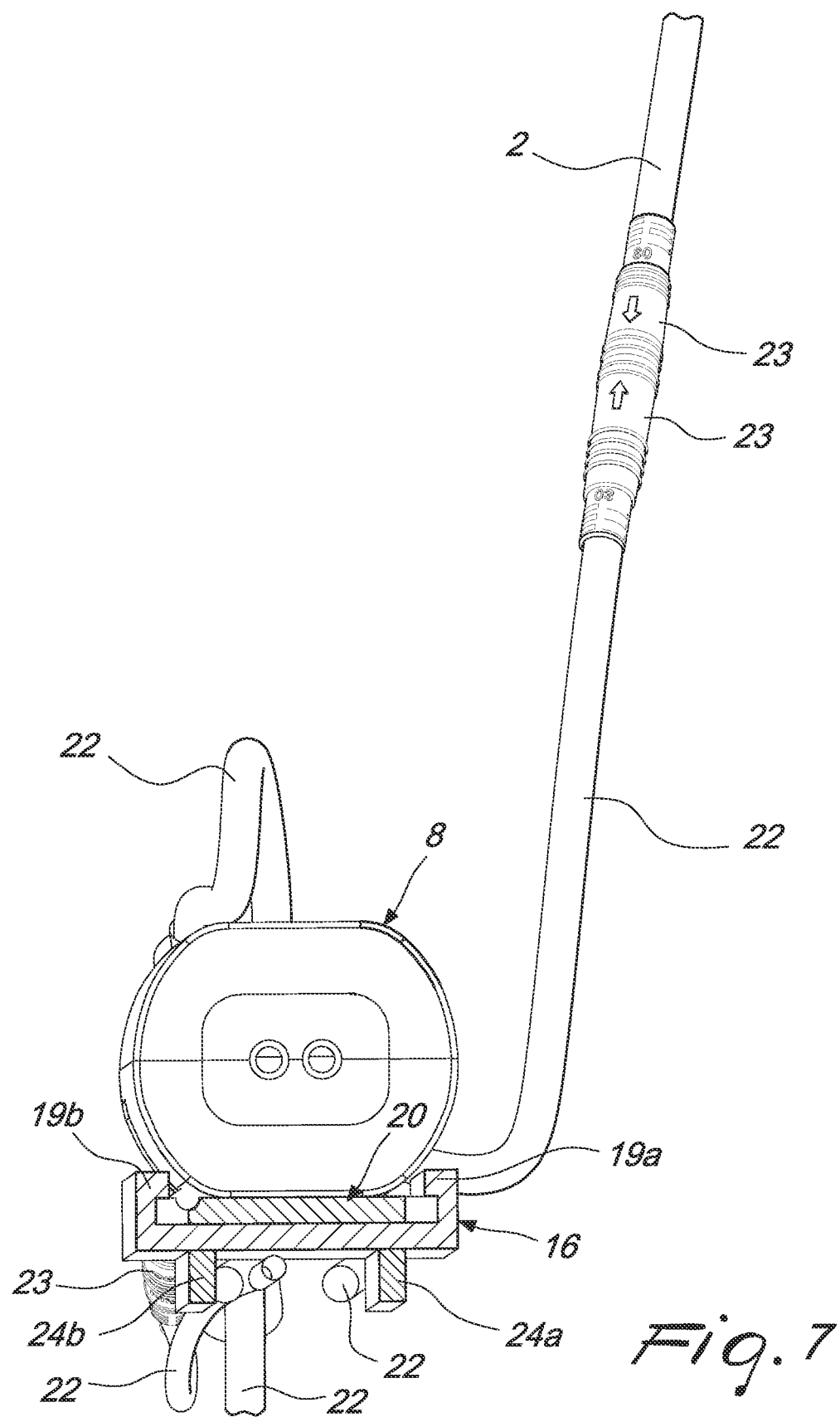
FIG. 7 is a view taken along a sectional plane that is transverse to the battery on the opposite side with respect to the bottom bracket.
Figure 8:
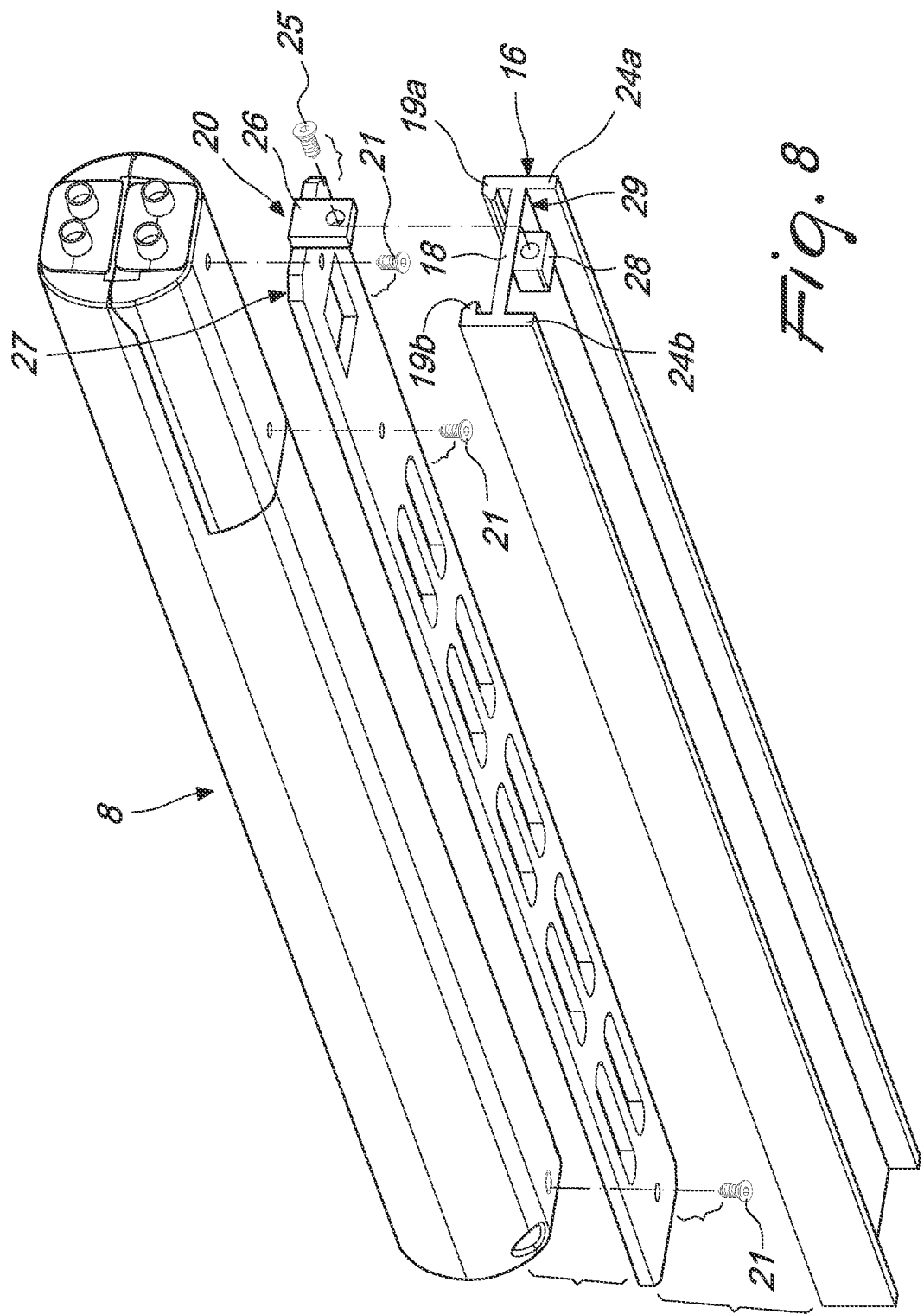
FIG. 8 is an exploded view of the battery, the slider and the plate; lip
Figure 9:
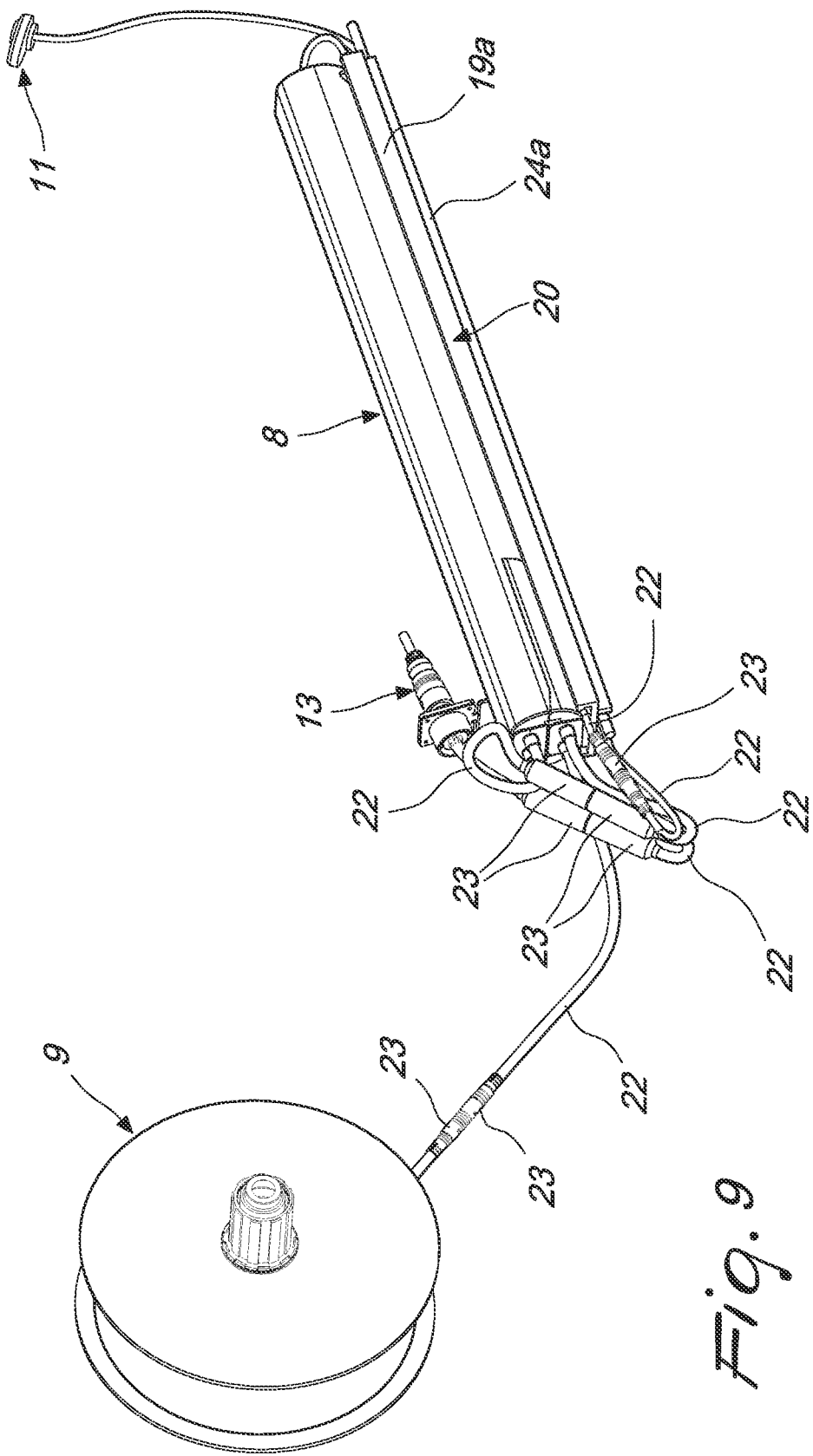
FIG. 9 is a lateral perspective view of the assembly of the battery and of its wiring.
Figure 10:
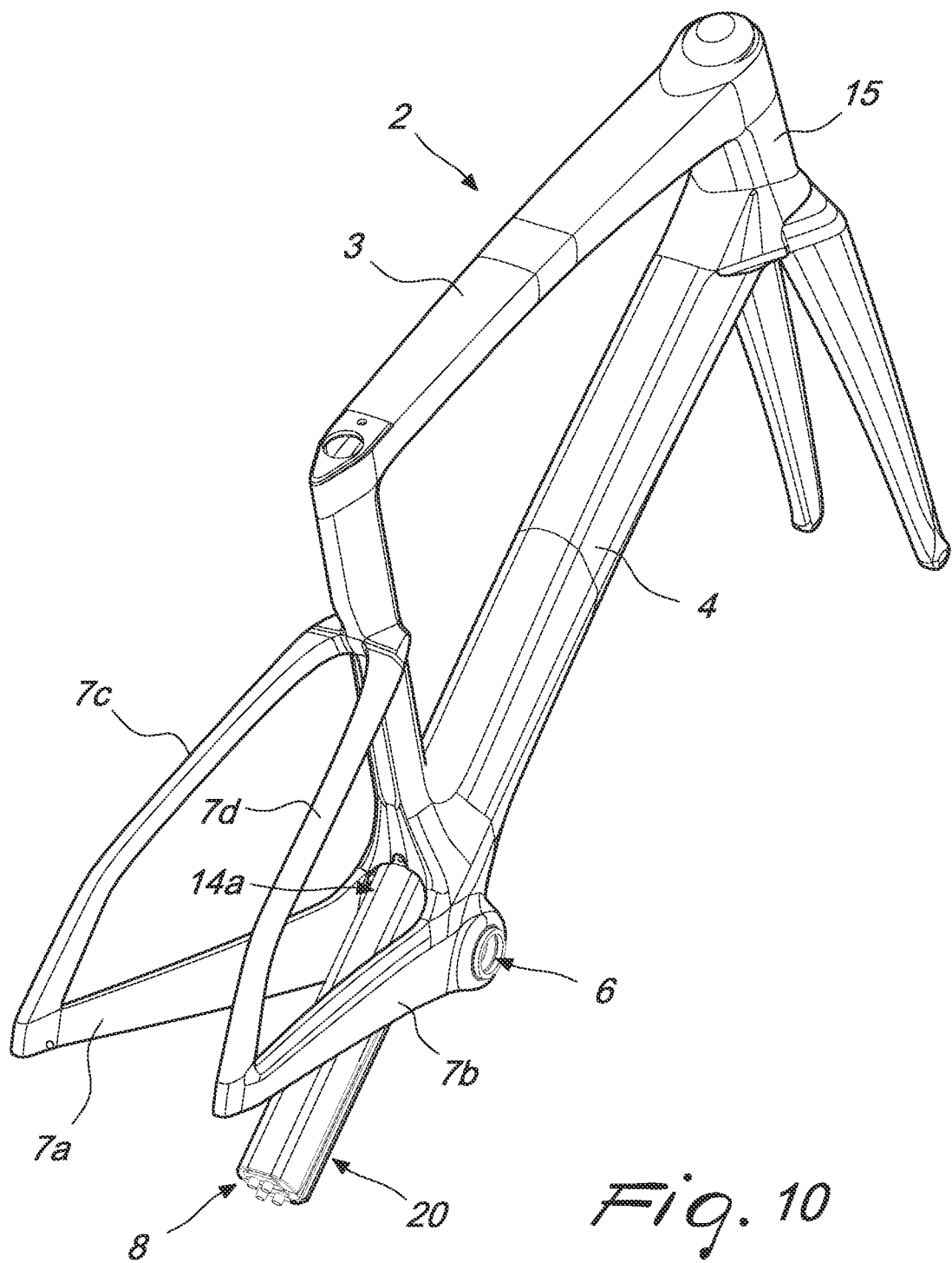
FIG. 10 is a rear perspective view of the condition in which the battery is partially extracted.
Figure 11:
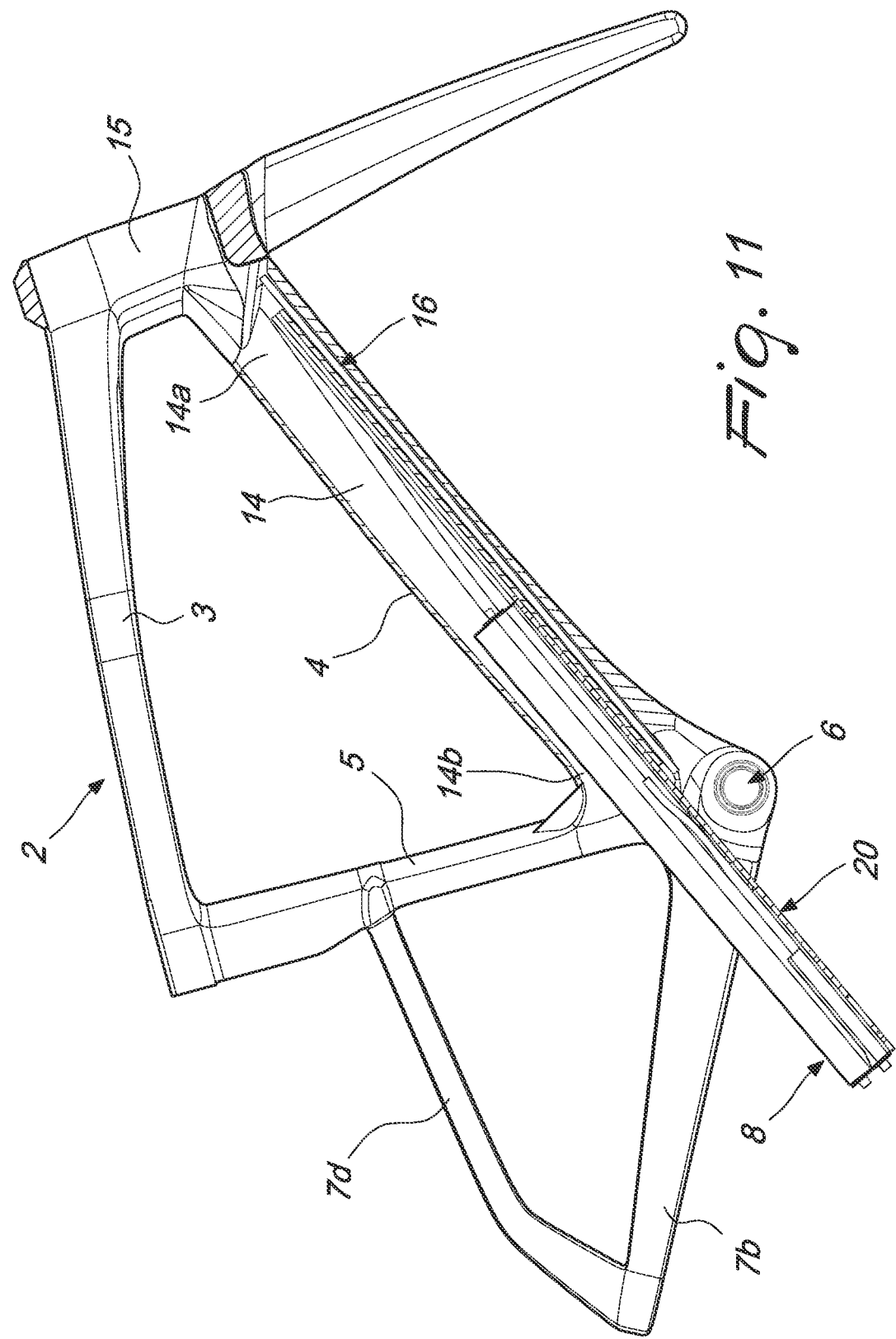
FIG. 11 is a partially sectional side view of the frame with the battery partially extracted.
Figure 12:
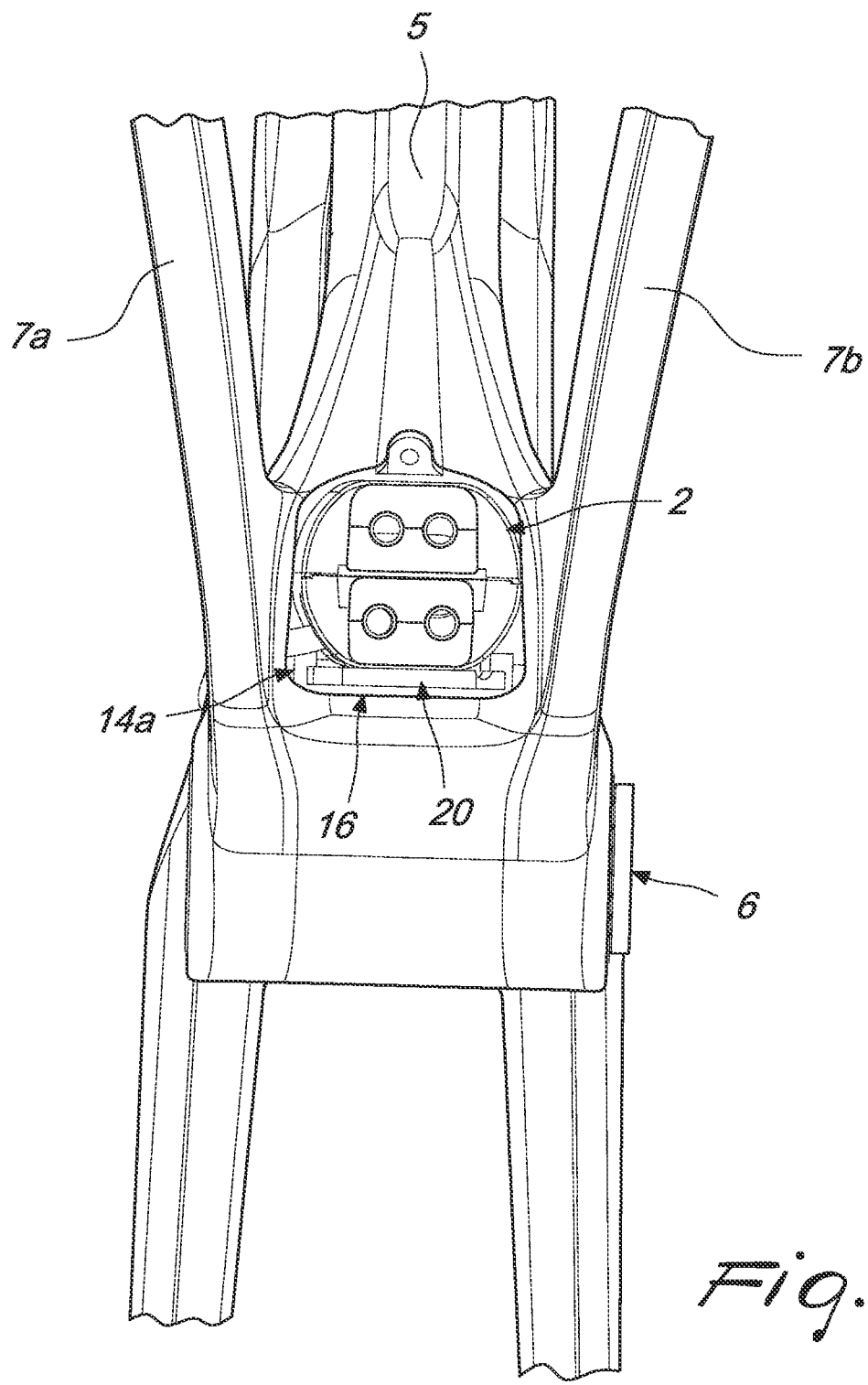
FIG. 12 is a rear view of the access to the battery.

In the embodiments that follow, individual characteristics, given in relation to specific examples, may actually be interchanged with other different characteristics that exist in other embodiments.

With reference to the above figures, the reference numeral 1 designates a bicycle which comprises a frame 2 composed of an upper tube 3 connected, by means of a front vertical tube 15 with which the handlebar 12 is to be associated, with a front oblique tube 4 and with a rear vertical tube 5, which in turn are connected in a lower region so as to form a seat 6 for a bottom bracket (not illustrated) and with which a pair of horizontal rear chainstays 7a, 7b and a pair of oblique rear chainstays 7c, 7d are coupled.

A battery 8 can be associated in a removable manner with the frame 2 for supplying power to electric components such as a motor 9 arranged on a hub 10 arranged between the terminal ends of the pair of horizontal rear chainstays 7a, 7b, a button or display 11 which can be arranged for example on the handlebar 12, a charging port 13 for a battery charger 13a.

The front oblique tube 4 has an axial seat 14 with a polygonal, preferably circular or elliptical, shape which extends substantially in the interspace that is present between the front vertical tube 15 with which the handlebar 12 is to be associated and the seat 6 for the bottom bracket.

The axial seat 14 is provided along an axis that passes above the seat 6 for the bottom bracket and has a blind upper end 14a and a lower end 14b that is open at the region where the pair of horizontal rear chainstays 7a, 7b is connected to the frame 2.

A slider 16 is advantageously fixed inside the axial seat 14 and has, in a transverse cross-section, a substantially H-like shape so as to form a flat base 18 from which two first L-shaped mutually opposite wings 19a, 19b extend upward and form a linear guide for a preferably rectangular plate 20.

The flat base 18 is advantageously arranged so as to be axially offset with respect to a central plane that is diametrical to the axial seat 14, so that above the flat base 18 there remains enough space to therewith associate the plate 20 with which the battery 8 is in turn to be associated by virtue of adapted first screws 21, the battery being thus removable together with the plate 20.

As an alternative, the plate 20 and the battery 8 can be monolithic. The axial seat 14 therefore has an axis which passes above the bottom bracket and the assembly of the battery 8 and of the plate 20 can be extracted through an opening located at the interspace between the pair of horizontal rear chainstays which coincides with the open lower end 14b of the axial seat 14.

The extension of the axial seat 14 is greater than the length of the assembly of the battery 8 and of the plate 20 so as to form, at the open lower end 14b, a space adapted to accommodate adapted cables 22 and associated pins 23 for connection and/or electric power supply.

In particular, the cable 22 for connection to the button or display 11 may be made to pass below the flat base 18 in the space formed by the second wings 24a, 24b.

The locking of the plate 20 to the slider 16 can be obtained for example by means of a second screw 25 which affects a perforated tab 26 which protrudes from the end 27 of the plate 20 in the opposite direction with respect to the battery 8, and a perforated protrusion 28 which protrudes from the end 29 of said flat base 18 in the opposite direction with respect to said first wings 19a, 19b.

Finally, there is a cover 30 for the closure of said lower end 14b of said axial seat 14, which is performed by means of a third screw 31.

It has thus been found that the invention has fully achieved the intended aim and objects, a bicycle having been obtained which allows the quick and easy insertion and extraction of a battery while allowing to improve ride stability.

Moreover, the battery is protected from any accidental impacts and at the same time is easily accessible for replacement.

The described solution allows moreover to facilitate the insertion of all the connectors of the battery so that they can be reached and disconnected easily.

Moreover, once the battery has been extracted and disconnected, the user can mount a rear wheel without a motor in the hub so as to have a lighter bicycle for purely muscle-powered use.

Finally, the various cables 22 and the pins 23 are accommodated inside the seat 14 so as to be protected against accidental impacts and dirt.

The materials used, as well as the shapes that constitute the individual components of the invention, may of course be more pertinent according to the specific requirements.

The characteristics indicated as advantageous, convenient or the like may also be omitted or replaced by equivalents.

The disclosures in Italian Patent Application No. 102020000018547 from which this application claims priority are incorporated herein by, reference.

What is claimed is:

1. A bicycle with removable battery for supplying power to electric components, comprising a frame composed of an upper tube connected with a front oblique tube and with a rear vertical tube, wherein the front oblique tube and the rear vertical tube are connected in a lower region so as to form a seat for a bottom bracket wherein a pair of horizontal rear chainstays are coupled to said bottom bracket and a pair of oblique rear chainstays are coupled to said rear vertical tube, wherein said front oblique tube has an axial seat for the removable battery and for accommodating connection and/or electric power supply cables, said axial seat having an axis that passes above said bottom bracket and a lower end that is open and located at an interspace between said pair of horizontal rear chainstays, and wherein a slider is fixed inside said axial seat and has, in a transverse cross-section, a substantially H-shape so as to form a flat base from which two first L-shaped and opposite wings extend upward and form a linear guide for a plate that has a rectangular shape.

2. The bicycle according to claim 1, wherein, said axial seat having a polygonal or circular or elliptical shape and being extended substantially in an interspace that is present between said front vertical tube with which a handlebar is to be associated and said seat for said bottom bracket, an extension of said axial seat being greater than a length of an assembly of said battery and of said plate so as to form, at an open lower end, a space adapted to accommodate cables and associated pins for connection and/or electric power supply.

3. The bicycle according to claim 2, wherein said axial seat is provided along an axis that passes above said seat for said bottom bracket and has a blind upper end and said lower end that is open at a region where said pair of horizontal rear chainstays is connected to said frame.

4. The bicycle according to claim 2, wherein said axial seat has a through axis above said bottom bracket and the assembly of said battery and of said plate can be extracted through an opening located at the interspace between said pair of horizontal rear chainstays which coincides with said open lower end of said axial seat.

5. The bicycle according to claim 1, wherein said flat base is arranged so as to be axially offset with respect to a central plane that is diametrical to said axial seat, so that above said flat base there remains enough space to therewith associate said plate, with which said battery is in turn to be associated by virtue of first screws, said battery being thus removable together with said plate.

6. The bicycle according to claim 1, wherein locking of said plate to said supporting slider is obtained by means of a second screw which affects a perforated tab which protrudes from an end of said plate in an opposite direction with respect to said battery, and a perforated protrusion which protrudes from an end of said flat base in an opposite direction with respect to said wings.

7. The bicycle according to claim 1, comprising a cover for the closure of said lower end of said axial seat, which is performed by means of a third screw.

8. The bicycle according to claim 1, wherein said electrical components are constituted by a motor which is arranged on a hub arranged between terminal ends of said pair of horizontal rear chainstays, a button or display which can be positioned on the handlebar, and a charging port.

9. The bicycle according to claim 8, wherein a cable for connection to said button or display passes below said flat base in a space formed by said opposite wings.

* * * * *